(12) United States Patent
Hagiwara

(10) Patent No.: US 7,880,983 B2
(45) Date of Patent: Feb. 1, 2011

(54) LENS DRIVING DEVICE

(75) Inventor: Kazuyoshi Hagiwara, 1-306, 19-Banchi Morinodai, Midori-Ku, Yokohama-Shi, Kanagawa (JP)

(73) Assignees: Micro win Tech, Inc., Tokyo (JP); Largan Precision Co., Ltd., Taichung (TW); Kazuyoshi Hagiwara, Kanagawa (JP)

( * ) Notice: Subject to any disclaimer, the term of this patent is extended or adjusted under 35 U.S.C. 154(b) by 0 days.

(21) Appl. No.: 12/654,980

(22) Filed: Jan. 12, 2010

(65) Prior Publication Data

US 2010/0214681 A1 Aug. 26, 2010

(30) Foreign Application Priority Data

Feb. 26, 2009 (JP) ............................. 2009-044056

(51) Int. Cl.
*G02B 7/02* (2006.01)
(52) U.S. Cl. ....................................... 359/819; 359/823
(58) Field of Classification Search ......... 359/813–814, 359/819, 821–824, 825–826
See application file for complete search history.

(56) References Cited

U.S. PATENT DOCUMENTS

2003/0076602 A1 * 4/2003 Nishikawa .................. 359/819

FOREIGN PATENT DOCUMENTS

| JP | 11-328698 | 11/1999 |
| JP | 2004280031 | 10/2004 |
| JP | 2008-040017 | 2/2008 |

* cited by examiner

*Primary Examiner*—Ricky L Mack
*Assistant Examiner*—Vipin M Patel
(74) *Attorney, Agent, or Firm*—Bacon & Thomas, PLLC

(57) ABSTRACT

A lens driving device is provided to reduce a number of required high-accuracy components and also eliminate the unevenness of maximum displacement of a lens holder with respect to a base. An outer edge of a lower spring plate is clamped by a lower casing served as a base and a lower spacer. A first protrusion is formed on a sidewall of the lens holder and protruding outward therefrom. A second protrusion protruding toward the lens holder is formed on an inner circumference of the lower spacer and extends to a position above and separating from the first protrusion by a distance S. The first protrusion props against the second protrusion when the lens holder is moved toward an imaged-object side and reaching a displacement of the distance S.

3 Claims, 4 Drawing Sheets

LENS DRIVING DEVICE

FIELD OF THE INVENTION

The present invention relates to a lens driving device for a camera; more particularly, to a lens driving device with spring plates elastically supporting a lens holder holding object lenses on a base.

DESCRIPTION OF RELATED ART

Recently, with the increase in the pixel numbers of the camera installed inside a mobile device, such as a cell phone, the development of the camera is moving toward high-performance functions, such as zoom processing or fine-moving-distance processing. With respect to the lens system installed inside the current digital device, the industry dedicates not only in the research of fixed-focal type lens system, but also in the research of vari-focal type lens system. As shown in FIG. 6, the lens driving device 50 employing the voice coil motor is generally used in the case of vari-focal type lens systems (For example, please refer to the patent document 1 incorporated herein).

As shown in FIG. 6, the lens driving device 50 comprises: at least one lens 51, a lens holder 52 for holding the lens 51 in a central position, a driving coil 53 mounted on a sidewall of the lens holder 52, a cylindrical yoke 54 made of magnetic materials such as soft iron, with L-shaped cross-section and disposed around the lens holder 52 with a predetermined spacing, a magnet 55 mounted on the inner wall of the yoke 54, a lower casing (base) 56 with the yoke 54 installed thereon, spring plates 57A, 57B connecting the lens holder 52 with the lower casing 56, and an upper casing 58 covering on the spring plate 57A. The movable lens holder 52 is supported on the stationary lower casing (base) 56 and may perform up-and-down movement with respect to the lower casing 56.

For the lens driving device 50 with spring plates 57A, 57B, two spacers 59A, 59B are provided on the edge portion of the spring plates 57A, 57B in order to mount the spring plates 57A, 57B firmly in the device. Specifically, the upper spacer 59A is mounted between the upper spring plate 57A, yoke 54 and the lower casing 56, while the lower spacer 59B is mounted between the lower spring plate 57B and the yoke 54.

In this way, the edge portion of the upper spring plate 57A is firmly held between the upper casing 58 and the upper spacer 59A, and the edge portion of the lower spring plate 57B is firmly held between the lower spacer 59B and the lower casing 56, allowing the lens 51 to steadily move up-and-down.

Besides, the driving coil 53 of the lens driving device 50 is placed in radially-distributed magnetic field created by the yoke 54 and the magnet 55 around the coil 53. Thus, when the driving coil 53 is powered, the driving coil 53 will generate a Lorentz force in a direction toward an imaged object (up-and-down direction), as indicated by an arrow shown in FIG. 6, to move the lens holder 52 toward a balance position of the Lorentz force and the restoring force of the spring plates 57A, 57B.

That is, by manipulating the current value powering the driving coil 53, the displacement of the lens holder 52 may be controlled to determine the position of the lens 51.

Furthermore, the upper casing 58 of the lens driving device 50 is provided with a protrusion 58$m$ for limiting the maximum displacement of the lens 51. The protrusion 58$m$ will prop against the front-end 52$m$ of the lens holder 52 when the lens holder 52 moves in the direction toward the imaged object, as the symbol S shown in FIG. 6, so as to limit the maximum displacement of the lens 51.

In addition, in some situations, the protrusion for limiting the maximum displacement is provided on a side wall of the lens holder 52 rather than on the upper casing 58 (Refer to Patent document 2 and 3).

The patent documents incorporated herein as prior art references are as follows:
Patent document 1: JP 2004-280031
Patent document 2: JP 11-328698
Patent document 3: JP 2008-040017

As shown in an exploded view of FIG. 7, a conventional lens driving device 50 is constructed by stacking all components. The protrusion 58$m$ for limiting the maximum displacement of the lens 51 is placed on a topmost component, for example, the upper casing 58. For this reason, if the accuracy and completeness of the stacked components are not precisely controlled, there may be the problem of uneven length from the bottom of the lower casing 56, as the base, to the front-end of the lens holder 52.

The unevenness of length results in the unevenness of maximum displacement in the operation of the lens device. Therefore, with current method, it is difficult to precisely configure the maximum displacement of the lens device.

The aforementioned drawback is a serious problem to the miniaturization of the lens device.

Moreover, the requirement of maintaining high accuracy for dimensions of all components in the lens device may incur higher costs as well as more complications to manipulate the relevant components.

In the light of the drawback in prior art, the purpose of the present invention is to provide a lens driving device which demands less on components accuracy for the device and also eliminate the unevenness of maximum displacement of the lens holder with respect to the base.

BRIEF DESCRIPTION OF THE INVENTION

The present invention is directed to a lens driving device, comprising following components: a lens holder for holding at least one lens, a base placed on the outer portion of the lens holder, an upper spring plate connecting to an imaged-object side on the top of lens and a lower spring plate connecting to the opposite side of the imaged-object on the bottom of the lens, and a spacer placed on an edge of the lower spring plate in proximity to the base for confining the lower spring plate thereunder. The lens driving device is characterized by an outward first protrusion formed on a lower potion of a side-wall of the lens holder and an inward second protrusion formed on an inner circumference of the spacer. The second protrusion is positioned above the first protrusion. The first protrusion and the second protrusion are configured to have a predetermined spacing therebetween in an up-and-down direction.

By providing components for limiting the maximum displacement of the lens on the lower position of the lens driving device when stacking all components, the number of high-accuracy components required may be reduced, and the unevenness of the maximum displacement of the lens holder with respect to the base may also be eliminated.

Accordingly, not only the maximum displacement of the lens may be precisely controlled, but the rising costs of relevant components may also be avoided for the present invention.

In addition, the present invention is characterized by providing a plurality of first protrusions and second protrusions respectively on the lens holder and base.

By this way of limiting the maximum displacement of the lens holder with a plurality of protrusions, the maximum displacement may be precisely limited even in the condition that the lens holder is tilted. Moreover, in comparison with the configuration that the first protrusion and second protrusion are formed respectively on an outer circumference of the lens holder and an inner circumference of the spacer, the volume of the component is smaller to fulfill the requirement as a light-weighted device.

Also, the present invention is characterized in that the base is square in shape when viewed in the direction of an optic axis of the lens. The second protrusions are formed respectively on four corners of the square.

In this way, even though the base area is decreased, the spacer may still be placed precisely on the base, to achieve device miniaturization and weight reduction.

DETAILED DESCRIPTION OF THE INVENTION

The present invention will now be described with detailed embodiments. The following embodiments do not limit the invention relevant to the scope of claims. Also, all combination of the features described in the embodiments are not necessarily required in the solution means of the present invention.

Figure 1:
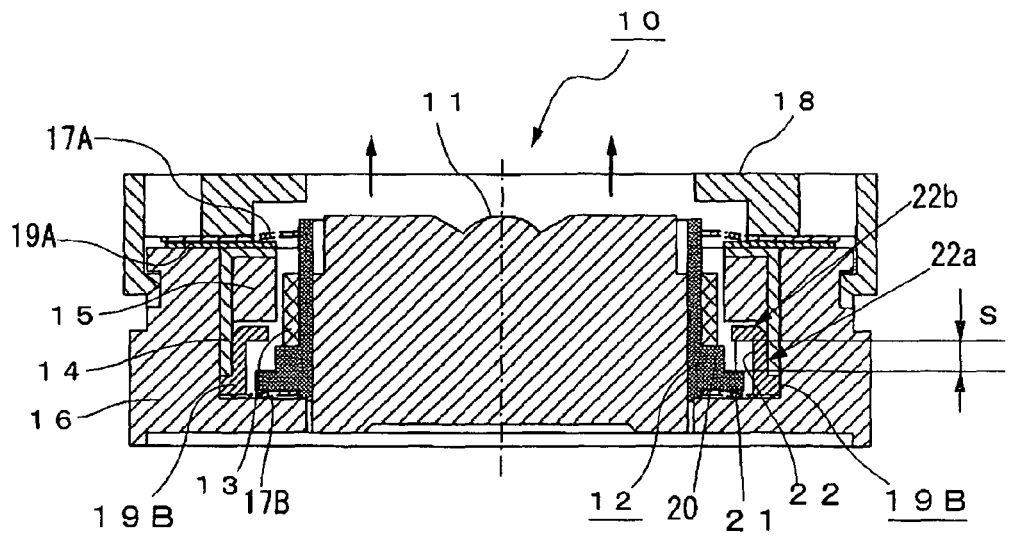
FIG. 1 is a cross-section view illustrating the lens driving device in accordance with an embodiment of the present invention.
Figure 2:
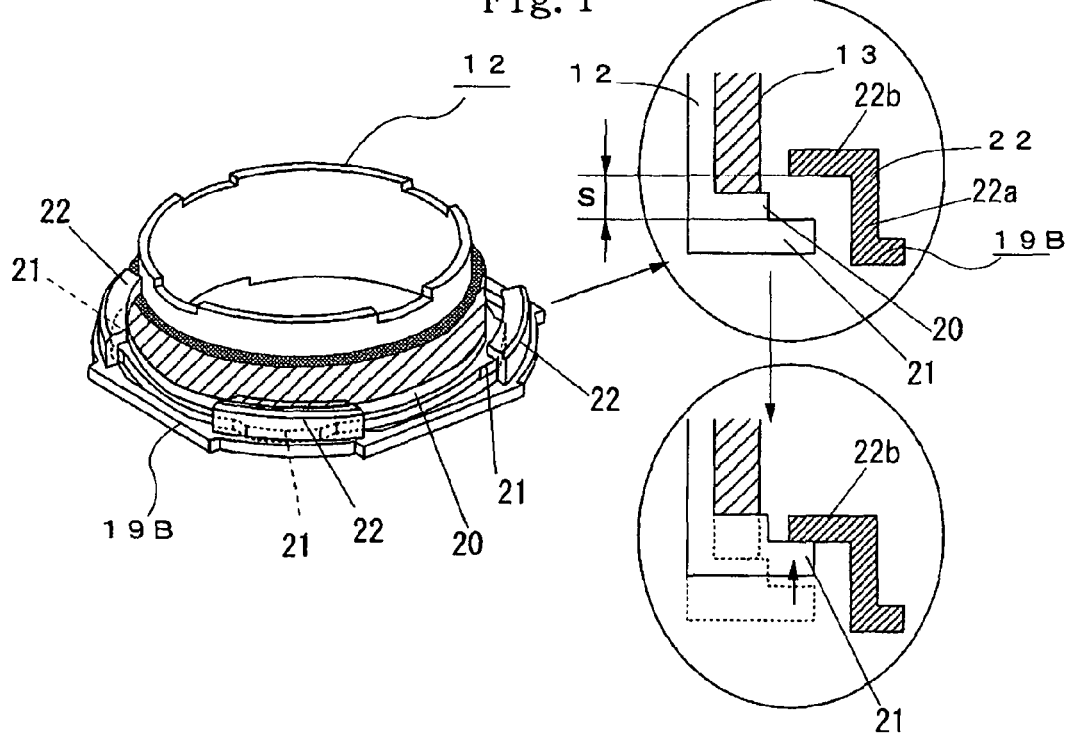
FIG. 2 is a view illustrating explicitly a relative position of the first protrusion and second protrusion of the present invention.
Figure 3:
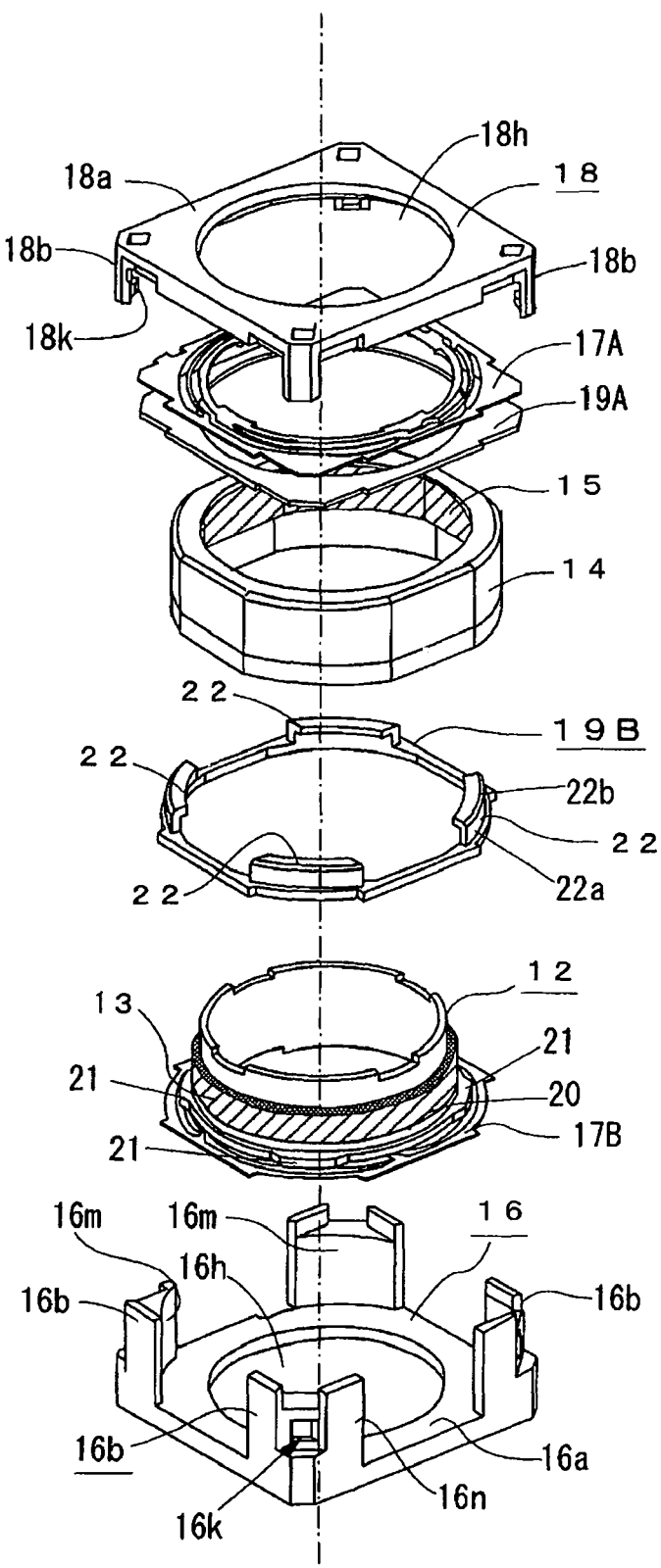
FIG. 3 is an exploded perspective view of the lens driving device in accordance with the embodiment of the present invention.

FIG. 1 is a cross-section view of a lens driving device 10 in accordance with the embodiment of the present invention. FIG. 2 is a view explicitly illustrating the relative position of the first protrusion and second protrusion of the present invention. FIG. 3 is an exploded perspective view of the lens driving device 10 of the present invention.

The lens driving device 10 comprises at least one lens 11, a lens holder 12, a driving coil 13, a yoke 14, a magnet 15, a lower casing 16 served as a base, an upper spring plate 17A, a lower spring plate 17B, an upper casing 18, an upper spacer 19A, and a lower spacer 19B.

Lower spacer 19B is a component equivalent to the spacing member of the present invention.

The arrow shown in FIG. 1 and FIG. 2 indicates the direction of the imaged object (object not shown). The imaged-object side is referred hereinafter as an upper side, and an opposite side of the imaged-object side is referred as a lower side.

Also, the lens 11 is omitted in FIG. 3.

In the figures, the lens holder 12 is a movable, cylindrical component holding lenses comprised of an object lens and an ocular lens at a central position. A lower portion of an outer sidewall of the lens holder 12 is provided with a flange 20 protruding toward the yoke 14 for positioning, and a protrusion 21 protruding from a lower portion of the flange 20. The protrusion 21 will be referred hereinafter as first protrusion.

As shown in FIG. 2, the protruding distance of the flange 20 is slightly longer than the difference of an inner diameter and an outer diameter of the driving coil 13. The protruding distance of the first protrusion 21 is longer than the protruding distance of the flange 20.

The driving coil 13 is mounted on the outer sidewall of the lens holder 12. Specifically, the driving coil 13 is mounted by supporting the driving coil 13 on the flange 20 for positioning. In this way, the driving coil 13 can be precisely mounted on a predetermined position of the lens holder 12.

Yoke 14 is a cylindrical component made of magnet, such as soft iron, with L-shaped cross-section, positioned around the circumference of the lens holder 12 with a predetermined spacing. In this embodiment, four portions on the outer sidewall of the cylindrical yoke are cut in order to reduce the size of the yoke 14, as shown in FIG. 3.

In the figure, a magnet 15 is attached on the inner wall of the yoke 14 and acts in accordance therewith yoke 14 to apply radially-distributed magnetic field around the driving coil 13. The magnet 15 is shaped along the inner wall of the yoke 14. That is, planar magnet pieces are placed on the cut positions of the inner wall of the yoke 14, while the magnet pieces with arc-shaped cross-section are placed on the arc portions of the inner wall of the yoke 14.

There are a base 16a and a yoke supporting part 16b on the lower casing 16 as a stationary portion of the lens driving device 10.

The base 16a is a square plate having an opening 16h formed at a central portion thereof.

In the embodiment, the yoke supporting part 16b is respectively at each of the four corners of the base 16a with its supporting surface 16m facing the opening 16h of the lower casing 16. The supporting surfaces 16m individually support the arc-shaped outer sidewalls of the yoke 14 from the outside. Holes 16k is formed on the outer surface 16n of each of the yoke supporting parts 16b allowing a fitting piece 18k to snap-fit therein.

An upper casing 18 has a cover 18a constructed by a square plate having an opening 18h at its central portion and legs 18b protruding downwardly respectively from four corners of the cover 18a with fitting pieces 18k formed thereon to snap-fit the holes 16k protruding toward the opening 18h.

The upper spring plate 17A and lower spring plate 17B are made of phosphor bronze with notches formed thereon surrounding by smooth, arc-shaped curves.

The upper spring plate 17A connects an upper surface of the lens holder 12 to a lower surface of the upper casing 18, while the lower spring plate 17B connects a lower surface of the flange 20 of the lens holder 12 to an upper surface of the base 16a of the lower casing 16.

In such a configuration, an annular spacer (upper spacer) 19A is provided on the upper surface of the lower casing 16 (specifically, the upper surface of the yoke supporting parts 16b) and the upper side of the yoke 14. The outer edge of the upper spring plate 17A is clamped between the upper spacer 19A and the upper casing 18. Similarly, an annular spacer (lower spacer) 19B is provided under the yoke 14. The outer edge of the lower spring plate 17B is clamped between the lower spacer 19B and the base 16a of the lower casing 16.

In this manner, the outer edges of the upper spring plate 17A and the lower spring plate 17B may be firmly mounted in the lower casing 16, which acts as the stationary portion of the lens driving device 10.

As shown in the figure, the lower spacer 19B is formed in an annular shape with four cut portions similar to the yoke 14. The lower spacer 19B has four protrusions 22. The protrusions 22 will be referred hereinafter as second protrusion 22.

The four second protrusions 22 are formed respectively on the four arc-shaped portions of the annular ring. After assembly, as shown in FIG. 3, the second protrusion 22 is positioned at a position further inside than the supporting face 16m of the yoke supporting part 16b at the four corners of the base 16a of the lower casing 16.

Also, as shown in FIG. 2 and FIG. 3, the second protrusion 22 has a vertical piece 22a formed uprightly on the lower spacer 19B and a horizontal piece 22b extending from the vertical piece 22a toward the lens holder 12.

Besides, the horizontal piece 22b of the second protrusion 22 is positioned over the first protrusion 21 formed on the lower outer sidewall of the lens holder 12 after assembly. That is, the fore-end of the horizontal piece 22b of the second protrusion 22 is closer to the lens holder 12 than the fore-end of the first protrusion 21. And, the first protrusion 21 is separated from the second protrusion 22 by a distance S.

Accordingly, when powering the driving coil 13, the lens holder 12 is moved upwardly toward the imaged-object side. As shown in FIG. 2, if the displacement reaches the distance S, the upper surface of the first protrusion 21 will prop against the lower surface of the horizontal piece 22b of the second protrusion 22 to prevent the further upward movement of the lens holder 12.

That is, the second protrusion 22 is a confining member with the function of limiting the maximum displacement of the lens holder 12. In this case, the distance S in the up-and-down direction between the first protrusion 21 and the second protrusion 22 is the maximum displacement of the lens holder 12.

According to the configuration of this embodiment, the outer edge of the lower spring plate 17B is clamped between the lower casing 16 served as the base and the lower spacer 19B, and the sidewall of the lens holder 12 also has a first protrusion 21 protruding outward. The inner sidewall of the lower spacer 19B has a second protrusion 22 protruding toward the lens holder 12. The second protrusion 22 extends to a position above and separating from the first protrusion 21 by a distance S. Upon the lens holder 12 moving up toward the imaged-object side and the displacement reaching the distance S, the first protrusion 21 will prop against the second protrusion 22 precisely limiting the maximum displacement of the lens holder 12.

Furthermore, since the lower spacer 19b functions as a confining member after assembly, the number of required high-accuracy components is reduced.

Moreover, since the second protrusion 22 is formed respectively on the four arc-shaped portions of the lower spacer 19B, the second protrusion 22 will not exceed the area of the base 16a of the lower casing 16 after assembly. It is not necessary to increase the size of the lower casing 16. The device may, therefore, be miniaturized.

In addition, though there are four first protrusions 21 and four second protrusions 22 provided respectively in the embodiment, it is possible in the present invention to achieve the functionality of limiting the maximum displacement of the lens holder with only two protruding portions. Furthermore, depending on the shape of the yoke 14 and the lower casing 16, it is not necessary to have exact two or four protruding portions used in the present invention. The configuration may be accommodated to the structure of the lens driving device.

Figure 4:
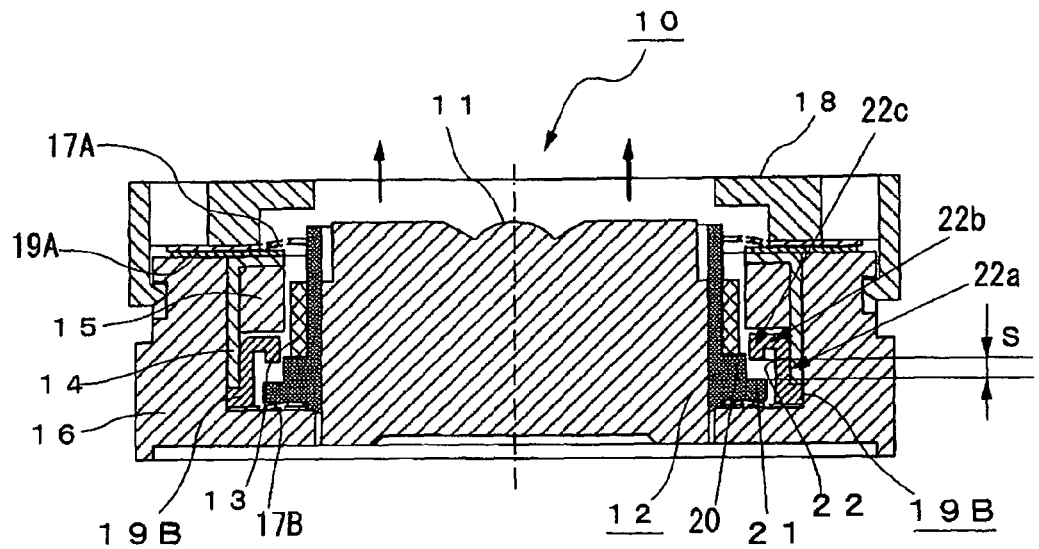
FIG. 4 is another configuration of the second protrusion of the present invention.

Moreover, though the second protrusion 22 is constructed only with a vertical piece 22a and a horizontal piece 22b, in the case of the configuration that the driving coil 13 is closer to the horizontal piece 22b, such as shown in FIG. 4, it is desirable to provide a confining part 22c protruding toward the first protrusion 21 at one side of the horizontal piece 22b opposite to the vertical piece 22a. In such a configuration, the confining part 22c may prop against the flange 20 to prevent the second protrusion 22 from touching the driving coil 13 and damaging the driving coil 13, even in the condition that the lens holder 12 is suffering significant vibration in a radial direction.

Figure 5:
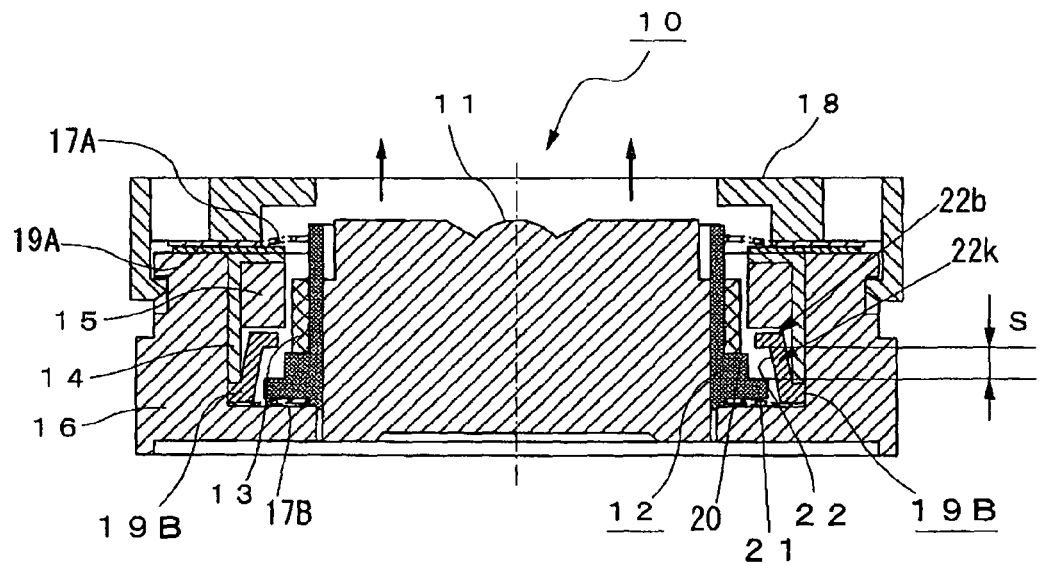
FIG. 5 is another configuration of the second protrusion of the present invention.
Figure 6:
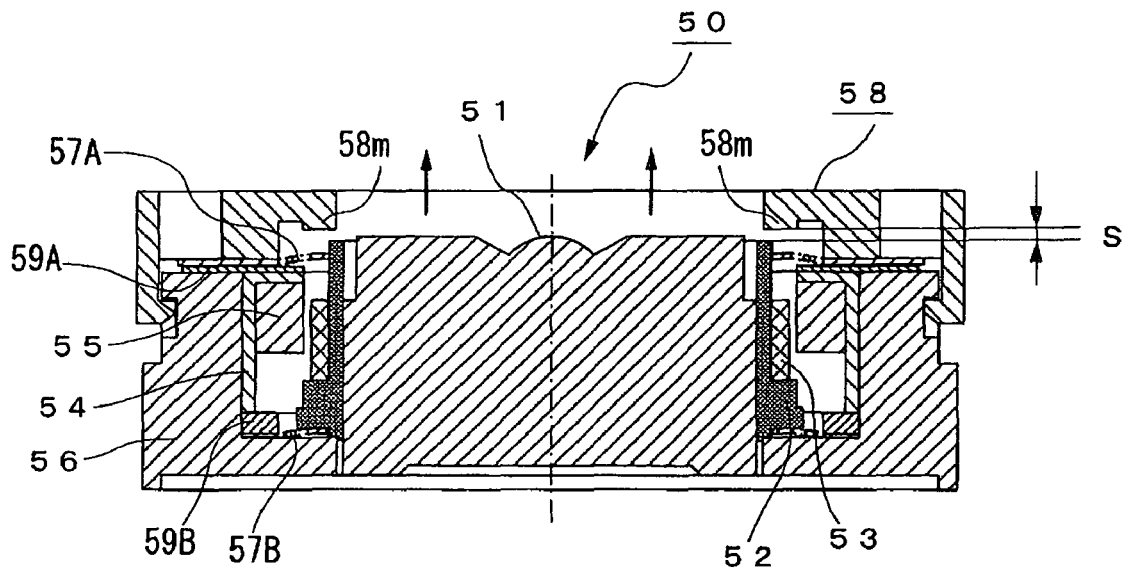
FIG. 6 is a cross-section view illustrating a convention lens driving device.
Figure 7:
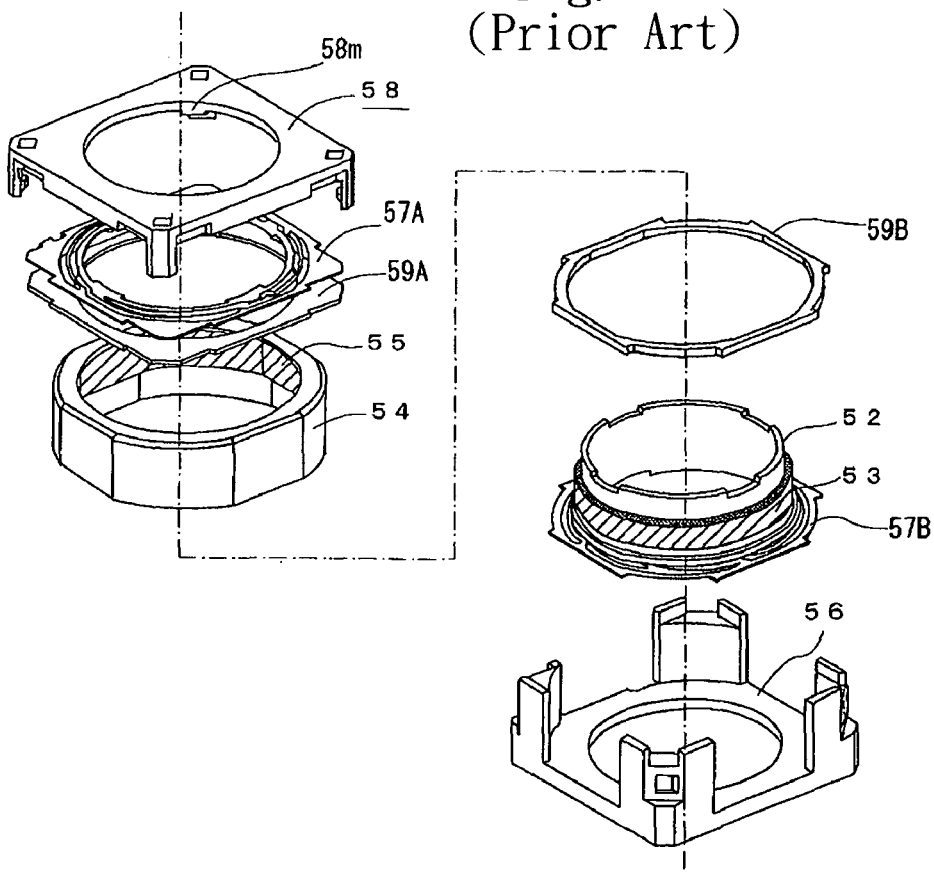
FIG. 7 is an exploded perspective view of the conventional lens driving device.

Furthermore, as shown in FIG. 5, if there is sufficient clearance between each component, the vertical piece 22a can be replaced by a supporting piece 22k, which protrudes obliquely upward from the lower spacer 19B. This configuration facilitates the installation of the yoke 14 and also improves the performance of operation.

The embodiments of the present invention described hereinbefore are only for the exemplary use, not intended to limit the scope of the present invention. It is obvious to those ordinarily skilled in the art that various modifications and alterations of the present invention may be made therefrom. It is clear from the claims that the configurations with such modifications and alterations are included in the scope of the present invention.

As described above, even though the number of required high-accuracy components of the present invention is reduced, the unevenness of the maximum displacement of the lens holder still can be avoided. As such, the present invention can easily and precisely control the maximum displacement of the lens and also prevent the costs of the components from rising.

What is claimed is:

1. A lens driving device, comprising:
   a lens holder for holding the lens;
   a base provided outside of said lens holder;
   an upper spring plate connecting said lens holder to an imaged-object side on the top of the lens and a lower spring plate connecting said base to a side opposite to the imaged-object side on the bottom of the lens;
   a spacer provided on an edge portion of said lower spring plate proximate to said base for confining said lower spring plate;
   a first protrusion formed on a lower portion of a sidewall of said lens holder and protruding outward from the sidewall of said lens holder; and
   a second protrusion formed on an inner circumference of said spacer and protruding toward said lens holder, wherein said second protrusion is positioned above said first protrusion, said first protrusion and said second protrusion are configured to have a predetermined spacing therebetween in an up-and-down direction.

2. The lens driving device of claim 1, wherein said lens holder and said base are provided respectively with a plurality of said first protrusion and said second protrusion.

3. The lens driving device of claim 1, wherein said base is square in shape when viewed in a direction of an optic axis of said lens, and said second protrusion is formed respectively at each of four corners of the square.

* * * * *